United States Patent
Mettler (10) Patent No.: US 11,358,549 B2
(45) Date of Patent: Jun. 14, 2022

(54) REMOVABLE GRILL COVER AND ATTACHMENT CLIP

(71) Applicant: Lund, Inc., Buford, GA (US)

(72) Inventor: Dean Edward Mettler, Howe, IN (US)

(73) Assignee: Lund, Inc., Buford, GA (US)

( * ) Notice: Subject to any disclaimer, the term of this patent is extended or adjusted under 35 U.S.C. 154(b) by 155 days.

(21) Appl. No.: 16/127,563

(22) Filed: Sep. 11, 2018

(65) Prior Publication Data
US 2019/0077351 A1    Mar. 14, 2019

Related U.S. Application Data

(60) Provisional application No. 62/558,494, filed on Sep. 14, 2017.

(51) Int. Cl.
*B60R 19/52* (2006.01)

(52) U.S. Cl.
CPC ........ *B60R 19/52* (2013.01); *B60R 2019/525* (2013.01)

(58) Field of Classification Search
CPC .......................... B60R 19/52; B60R 2019/525

USPC ...................................................... 296/193.1
See application file for complete search history.

(56) References Cited

U.S. PATENT DOCUMENTS

| 9,475,436 | B2 * | 10/2016 | Witkop | ............... B60R 13/0838 |
| 2009/0066096 | A1 * | 3/2009 | Doroghazi | .............. B60R 19/52 |
| | | | | 293/115 |
| 2015/0183365 | A1 * | 7/2015 | Aboughanem | .......... B60J 11/06 |
| | | | | 362/520 |

FOREIGN PATENT DOCUMENTS

CA    2266143 A1 *  9/1999

* cited by examiner

*Primary Examiner* — D Glenn Dayoan
*Assistant Examiner* — Dana D Ivey
(74) *Attorney, Agent, or Firm* — William H. Honaker; Dickinson Wright PLLC (57) ABSTRACT

Disclosed herein are embodiments of a removable grill cover and attachment clip. Advantageously, the grill cover to be removably attached to a grill of a vehicle without the need to drill or otherwise damage the grill. The grill cover can prevent ice formation on the vehicle in the winter time, and can act as a bug shield/bug screen in the summer months.

30 Claims, 6 Drawing Sheets

REMOVABLE GRILL COVER AND ATTACHMENT CLIP

INCORPORATION BY REFERENCE TO ANY PRIORITY APPLICATIONS

This Application claims from the benefit of U.S. Provisional Application No. 62/558,494, filed Sep. 14, 2017, titled "REMOVABLE GRILL COVER AND ATTACHMENT CLIP," the entirety of which is incorporated herein by reference.

BACKGROUND

Field

Embodiments of the present disclosure relate to removable grill covers for a vehicle.

Description of the Related Art

Grill covers can be used to protect vehicle grills, especially during the wintertime when snow, ice, or sleet can negatively affect the aesthetics of the grill. Previous solutions for attaching the grill involving screwing/drilling the cover directly into the grill. However, once the cover is removed, such as once spring arrives, the remaining holes from the screwing/drilling negatively affect the aesthetics of the grill. Further, some grill covers require the use of adhesive attachment members which adhere to the grill. These members can fall off during use, and can again negatively affect the aesthetics of the grill once removed.

SUMMARY

Disclosed herein are embodiments of cover assembly for a vehicle grill, the cover assembly comprising a cover configured to cover a surface of a vehicle grill, the cover having an outward facing surface and an inward facing surface, and an attachment assembly for removably attaching the cover to the vehicle grill, the attachment assembly comprising a pair of hooks configured to partially enclose the vehicle grill.

In some embodiments, the cover can further comprise at least one stretchable band attached to the inward facing surface of the cover, the at least one stretchable band extending from one end of the cover to an opposite end of the cover. In some embodiments, each of the hooks can be attached to an end of the at least one stretchable band. In some embodiments, the stretchable band can comprise two stretchable bands. In some embodiments, the assembly can further comprise a pair of tabs, each of the tabs attached to an end of the at least one stretchable band and extending laterally outwards.

Disclosed herein are embodiments of a cover assembly for a vehicle grill, the cover assembly comprising a cover configured to cover a front-facing surface of a vehicle grill, the cover having an outward facing surface, an inward facing surface, and a perimeter, and a plurality of attachment assemblies for removably attaching the cover to the vehicle grill, each of the plurality of attachment assemblies comprising a stretchable band attached to the inward facing surface of the cover, and a hook attached to the stretchable band, wherein the hook is configured to partially surround a portion of the vehicle grill.

In some embodiments, each of the stretchable bands can extend from one end of the cover to an opposite end of the cover. In some embodiments, each of the plurality of attachment assemblies can further comprise a tab, wherein the tab is attached to the hook and extends away from the hook.

In some embodiments, the cover can be flexible and is configured to contour on the vehicle grill. In some embodiments, the cover can include at least one through aperture extending over half of a height of the cover. In some embodiments, the cover can include at least four through apertures extending over half of a height of the cover. In some embodiments, the cover can be a vinyl cover.

In some embodiments, the plurality of attachment assemblies can be located on a top edge and a bottom edge of the cover. In some embodiments, the plurality of attachment assemblies can be further located on each side edge of the cover.

In some embodiments, no drilling or adhesive is used to attach the cover to the vehicle grill.

In some embodiments, the inward facing surface can be formed of a first material, and the outward facing surface is formed of a second material, and wherein the first material is attached to the second material. In some embodiments, the perimeter of the cover can be formed of a thicker material than a remainder of the cover. In some embodiments, the thicker material can be separate from the cover and is attached onto the perimeter of the cover.

Also disclosed herein are embodiments of a method of installing a cover to a vehicle grill, the method comprising positioning a cover over a front surface of the vehicle grill, the cover having an outward facing surface, an inward facing surface, and a perimeter, securing a first portion of the cover to a first portion of the vehicle grill, without altering the structure of the vehicle grill, and securing a second portion of the cover to a second portion of the vehicle grill.

In some embodiments, the securing of the first portion of the cover to the first portion of the vehicle grill can comprise securing a portion of a first connector secured to the cover behind the first portion of the vehicle grill. In some embodiments, the securing of the second portion of the cover to the second portion of the vehicle grill can comprise securing a portion of a second connector behind the second portion of the vehicle grill.

In some embodiments, no drilling or adhesive is used to secure the cover to the vehicle grill.

In some embodiments, the cover can be flexible and is configured to contour on the vehicle grill. In some embodiments, the cover can include at least one through aperture extending over half of a height of the cover. In some embodiments, the cover can include at least four through apertures extending over half of a height of the cover. In some embodiments, the cover can be a vinyl cover.

In some embodiments, the inward facing surface can be formed of a first material, and the outward facing surface is formed of a second material, and wherein the first material is attached to the second material. In some embodiments, the perimeter of the cover can be formed of a thicker material than a remainder of the cover. In some embodiments, the thicker material can be separate from the cover and is attached onto the perimeter of the cover.

In some embodiments, the cover can comprise a plurality of attachment assemblies for securing the cover to the vehicle grill, each of the plurality of attachment assemblies comprising a stretchable band attached to the inward facing surface of the cover, and a hook attached to the stretchable band, wherein the hook is configured to partially surround a portion of the vehicle grill. In some embodiments, each of the stretchable bands can extend from one end of the cover to an opposite end of the cover. In some embodiments, each of the plurality of attachment assemblies can further comprise a tab, wherein the tab is attached to the hook and extends away from the hook. In some embodiments, the plurality of attachment assemblies can be located on a top edge and a bottom edge of the cover. In some embodiments, the plurality of attachment assemblies can be further located on each side edge of the cover.

In some embodiments, securing the first portion of the cover to the first portion of the vehicle grill comprises wrapping the first portion of the cover at least partially around the first portion of the grill. In some embodiments, securing the first portion of the cover to the first portion of the vehicle grill comprises elastically gripping said first portion of the grill with the first portion of the cover after the first portion of the cover is positioned at least partially around the first portion of the grill.an edge of the grill.

Further disclosed herein are embodiments of a cover assembly for a vehicle grill, the cover assembly comprising a cover configured to cover a front-facing surface of a vehicle grill, the cover having an outward facing surface, an inward facing surface, and a perimeter; and a plurality of attachment assemblies for removably attaching the cover to the vehicle grill, each of the plurality of attachment assemblies comprising a first securement portion configured to wrap at least partially around a first portion of the grill and an elastic portion connected to first securement portion, such that the elastic portion facilitates holding the first portion of the cover in position after the first portion of the cover is positioned at least partially around the first portion of the grill.

DETAILED DESCRIPTION

Disclosed herein are embodiments of removable grill covers and attachment assemblies for removably attaching a grill cover to a vehicle, such as to cover a vehicle grill. In some embodiments, no drill or screws may be used to apply the grill cover to the vehicle. In some embodiments, no adhesives may be used between the grill cover and the vehicle to apply the grill cover to the vehicle. In some embodiments, the grill cover can be removably attached to the vehicle without causing any damage (e.g., drill/screw holes) to the vehicle.

Figure 1:
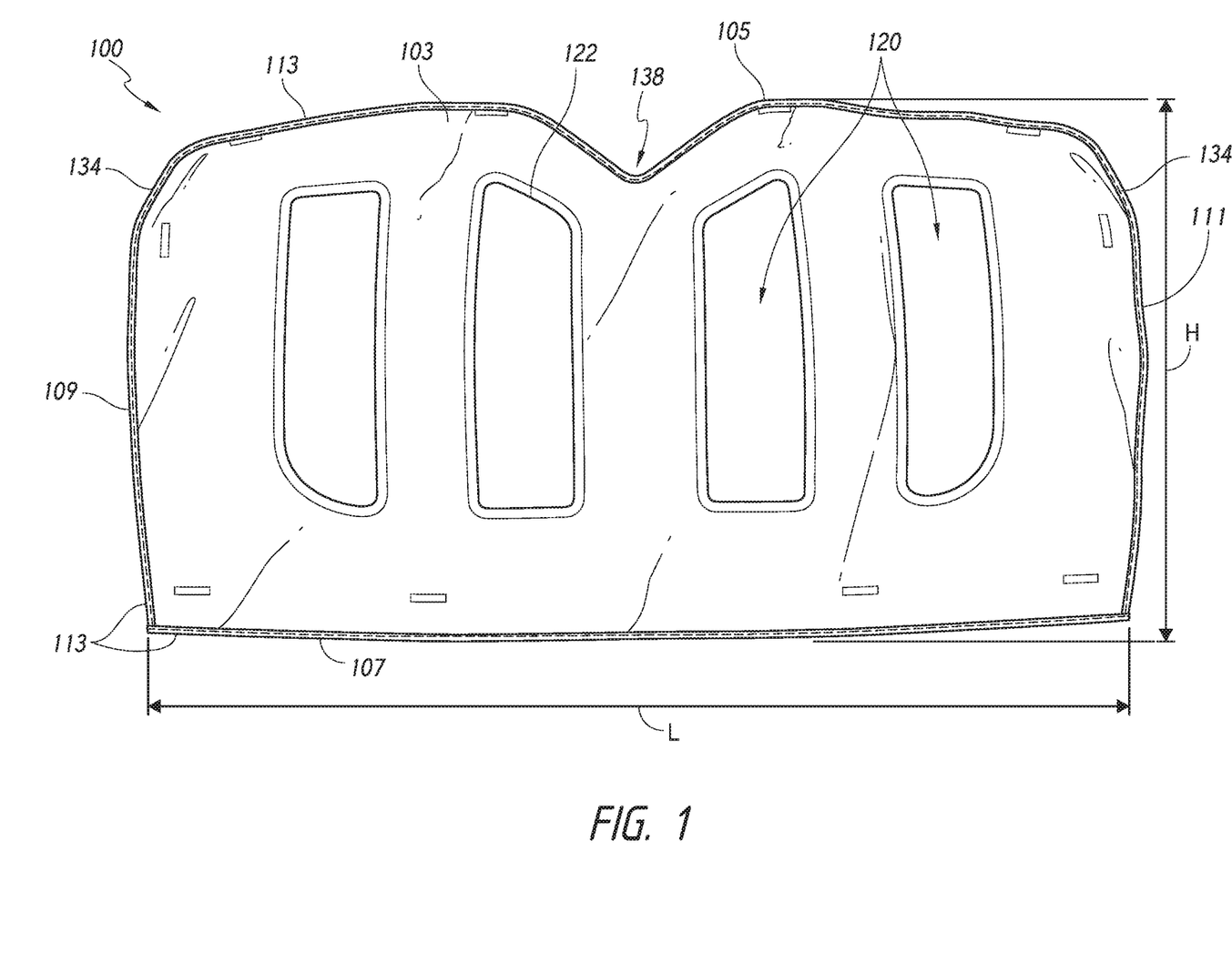
FIG. 1 illustrates an embodiment of a grill cover.

FIG. 1 illustrates an embodiment of a grill (or grille) cover 100. The grill cover 100 can prevent damage to the grill of a vehicle, or the vehicle in general, in particular during the winter months. For example, the grill cover 100 can prevent icicles from forming on the grill and can further help to keep the engine warm. The grill cover 100 can retain the heat of the vehicle engine, or can slow/reduce air flow to the engine leading to higher operating temperatures preventing the formation of ice. Thus, in some embodiments the cover 100 can advantageously allow the vehicle to run hotter or warmer to help burn fuel better and/or meet government regulations. In some embodiments the grill cover 100 can include one or more heating elements, such as a chemical or electrical heating element located within the grill cover 100. In addition, the cover 100 can be left on in summer months to act as a bug shield/bug screen or prevent other damage to the grill or vehicle, such as by heat, sun, or rocks. The cover 100 can be made of plastic, vinyl, polymers, rubbers, cloth, or a mixture of these materials, though the particular material does not limit this disclosure.

Figure 2:
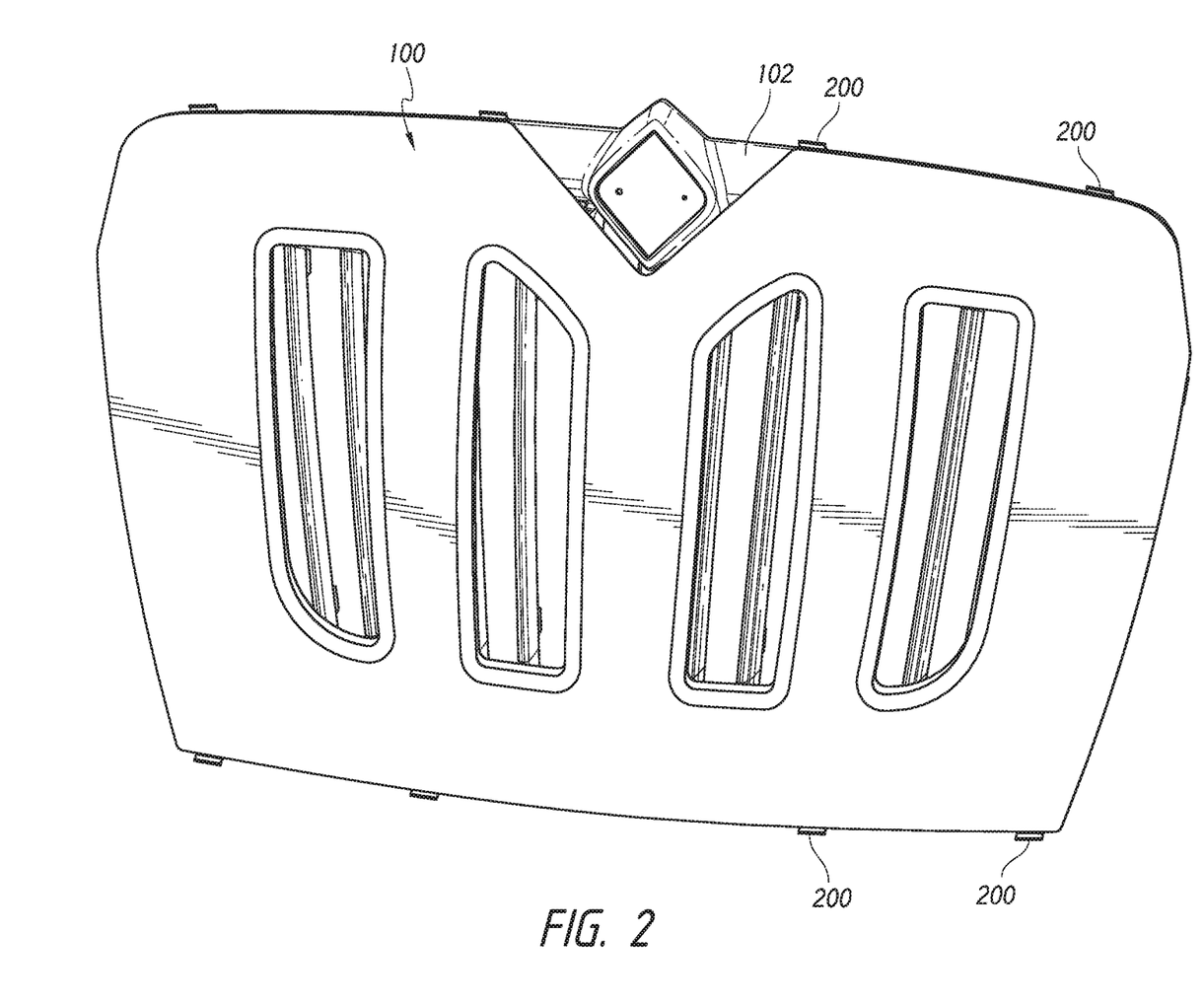
FIG. 2 illustrates an embodiment of a grill cover attached to a vehicle.

The cover 100 can generally cover a portion or all of a front surface of a vehicle grill, such as shown in FIG. 2. In some embodiments, the cover 100 can further cover some or all of the side/top/bottom edges of the vehicle grill. In some embodiments, the cover 100 can further cover some or all of a back surface of the vehicle grill.

As shown in FIG. 1, the cover 100 can have a length (L), a height (H), an outer surface (or outward facing surface) 103, an inner surface 101 (shown in FIG. 3), a thickness between the outer surface 103 and the inner surface 101, a top edge 105, a bottom edge 107, a first edge 109 and a second edge 111. In some embodiments, the inner surface 101, the outer surface 103, or both can be textured or partially textured. In some embodiments, the inner surface 101, the outer surface 103, or both can be smooth.

In some embodiments, the cover 100 can further include a perimeter edge material 113 which can surround a perimeter of the cover. The perimeter edge material 113 can be formed of a different, tougher material, or can be formed of a plurality of layers of material (thus making the perimeter edge material 113 thicker) that are used to form the cover 100. In some embodiments, the perimeter edge material 113 can be a separate material attached around the edges of the cover 100, thereby covering both the inner surface 101 and the outer surface 103. This material can provide extra toughness to the edges of the cover 100, thus preventing ripping, tearing, or other damage. In some embodiments, the cover 100 may not include a particular perimeter edge material 113 made of different or thicker material.

The perimeter edge material 113 can further include threads (e.g., threading) (such as threads 115 shown in FIG. 3) to form the stronger perimeter edge material 113, such as extending along the perimeter edge material 113, which can also improve strength of the cover 100. This can be especially advantageous when a separate material is used as the perimeter edge material 113. In some embodiments, the perimeter edge material 113 can have a thickness (e.g., from the outermost perimeter edge towards the center of the cover 100) of 0.1, 0.2, 0.3, 0.4, 0.5, 0.6, 0.7, 0.8, 0.9, 1, 1.5, or 2 inches. In some embodiments, the perimeter edge material 113 can have a thickness (e.g., from the outermost perimeter edge towards the center of the cover 100) of greater than 0.1, 0.2, 0.3, 0.4, 0.5, 0.6, 0.7, 0.8, 0.9, 1, 1.5, or 2 inches. In some embodiments, the perimeter edge material 113 can have a thickness (e.g., from the outermost perimeter edge towards the center of the cover 100) of less than 0.1, 0.2, 0.3, 0.4, 0.5, 0.6, 0.7, 0.8, 0.9, 1, 1.5, or 2 inches. In some embodiments, each side of the cover 100 can include its own perimeter edge material 113, thus there can be a plurality of perimeter edge materials 113. In some embodiments, the perimeter edge material 113 can extend around the entire perimeter of the cover 100.

As mentioned above, the cover 100 can have a thickness as defined as the distance between the inner surface 101 and the outer surface 103. As shown in FIG. 1, the length of the cover 100 can be larger than the height, forming a generally rectangular shape. In some embodiments, the length and height can be approximately the same, thereby forming a generally square shape.

As shown, the cover 100 can include one or more apertures (e.g., holes, cutouts) 120. The apertures 120 can confirm to open spaces in a grill of a vehicle. In some embodiments, the cover 100 may not include any apertures. As shown, four apertures 120 can be used, but in some embodiments 1, 2, 3, 4, 5, 6, 7, 8, 9, or 10 apertures may be used. In some embodiments, greater than 1, 2, 3, 4, 5, 6, 7, 8, 9, or 10 apertures may be used. In some embodiments, less than 2, 3, 4, 5, 6, 7, 8, 9, or 10 apertures may be used. In some embodiments, the apertures 120 may be reinforced 122 around the outer edges, such as in a similar manner as discussed above with respect to the perimeter edge material 113. In some embodiments, the apertures 120 can be reinforced through the use of a second material on the inner side 101 that partially overlaps the apertures 120 to form a ring of stronger material around the apertures 120.

FIG. 1 illustrates some example configurations of apertures 120, but other shapes and designs can be used as well. In some embodiments, the apertures 120 may be mirror images based on a vertical line through the center of the cover 100. In some embodiments, the apertures 120 may be mirror images based on a horizontal line through the center of the cover 100. The aperture 120 may include straight edges, curved edges, or combinations of both. In some embodiments, the apertures 120 may be quadrilateral, circular, triangular, or other polygonal shape and the particular shape does not limit the disclosure.

As shown in FIG. 1, each of the apertures 120 may be formed of a generally rectangular section having a curved triangular section on one end.

In some embodiments, the cover 100 may conform to a grill. For example, it may cover the entirety of the front facing portion of the grill. In some embodiments, edges of the cover 100 may at least partially wrap around the grill so that a portion of the cover 100 is located on a backward facing surface of the grill. In some embodiments, the cover 100 may fully wrap around the grill. In some embodiments, the cover 100 may have a design that conforms to a particular type of grill. However, in some embodiment the cover 100 may be flexible and shaped to cover any style of grill, for example a generally rectangular shape.

In some embodiments, the outer circumference of the cover 100 may include a "pocket" or pouch to receive an outer circumference of the grill and hold the cover 100 over the grill.

While FIG. 1 illustrates a particular design for a grill cover 100, other designs can be used as well for different shapes and sizes of vehicle grills. Therefore, the particular shape and design of the grill does not limit the disclosure.

As shown in FIG. 1, the grill cover 100 may include a bottom edge 130. The bottom edge 107 may be straight or curved. Attached at opposed ends of the bottom edge 107 are side edges 109/111, such as at a corner. In some embodiments, the side edges 109/111 may be straight or curved. As shown, the side edges 109/111 can bow outwards so that a line connecting the two side edges 109/111 at a vertical middle of the side edges 109/111 may be longer than the bottom edge 107. At the top, the side edges 109/111 may have curved corners 134, though in some embodiments this may be a straight edged corner. This leads to the top edge 105 of the cover 100. The top edge 105 may be generally straight in some embodiments. In some embodiments, the top edge 105 may extend further vertically than the curved corners 134. Generally at the center, the top edge 105 may include a dip 138 extending towards the bottom edge 107. The dip 138 may be V-shaped, U-shaped, or otherwise shaped. In some embodiments, the top edge 105 may not contain a dip. While a particular shape is discussed in the above paragraph, other shapes of covers can be used as well, such as generally rectangular, ovaloid, etc.

Figure 3:
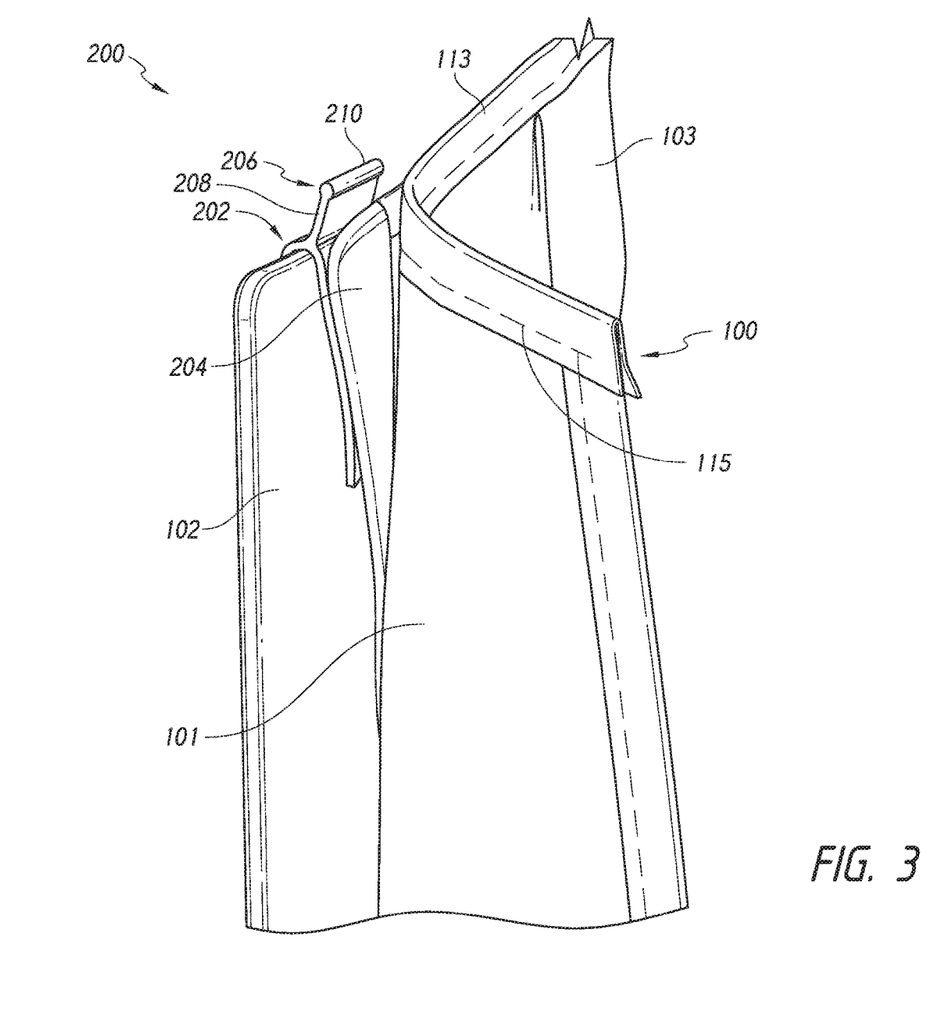
FIGS. 3-4 illustrates an embodiments of an attachment assembly attached to a vehicle.
Figure 4:
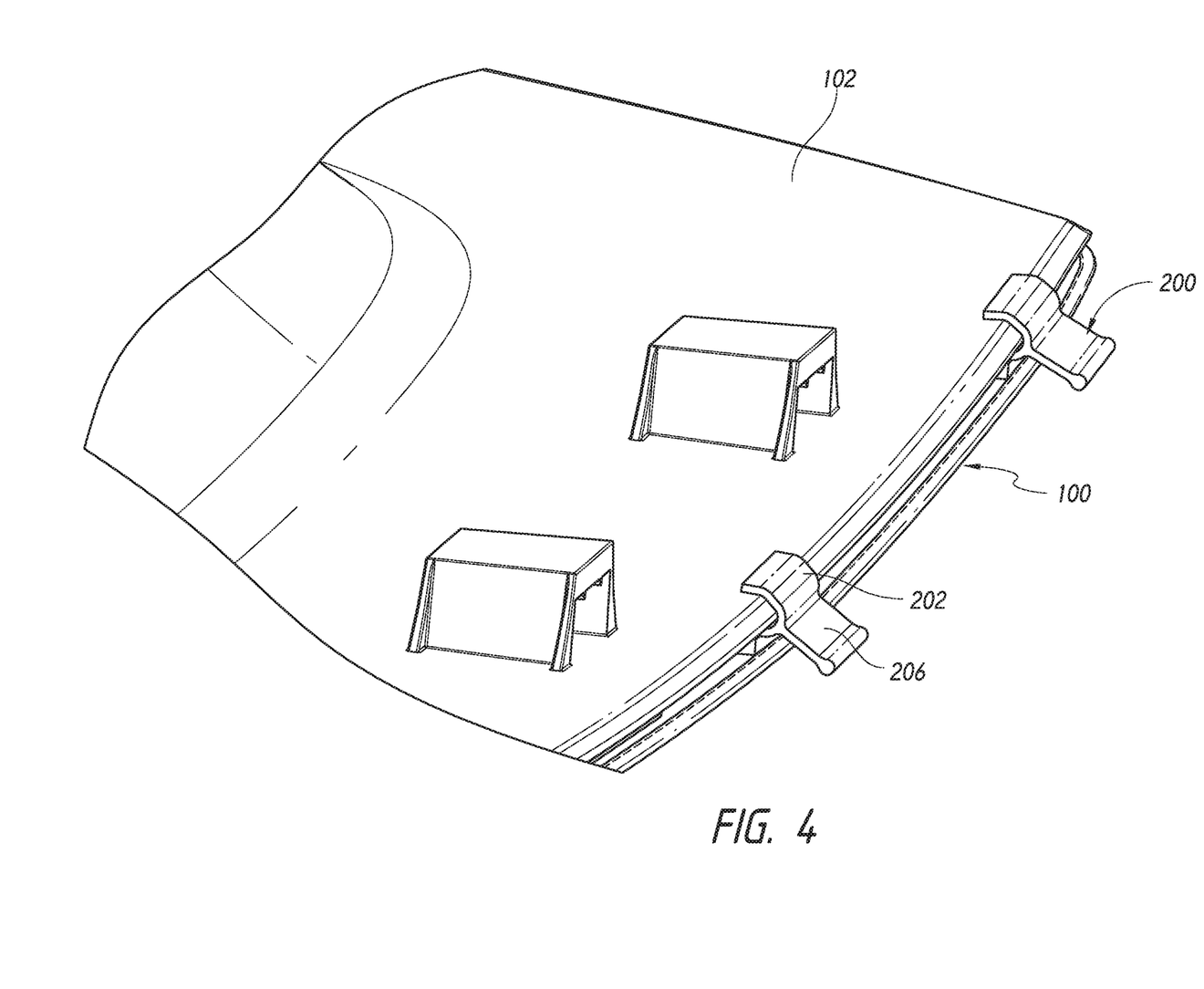

FIGS. 3-4 illustrates an example of a grill cover 100 attached to a vehicle grill 102, such as a truck grill. An attachment assembly (or clip or connector) 200 can be used to removably attach the grill cover 100 to the grill 102. The attachment assembly 200 can be attached to an inner surface (or inward facing surface) 101 of the grill cover 100. For example, the attachment clip 200 can be sewn, stapled, mechanically fastened, glued, epoxied, or chemically adhered to the inner surface of the grill cover 100. In some embodiments, the attachment assembly 200 can be attached to the outer surface 103 of the cover 100.

The attachment assembly 200 can be made up of a handle/hook assembly/hook 202 (such as a plastic, metal, ceramic, rubber hook) located on an end of a stretchable band (e.g., elastic band, stretchable material, elastic material) 204. Further, a tab 206 can be used in some embodiments. The stretchable band 204 may be the only portion of the assembly 200 directly attached to the cover 100, allowing some flexibility and movement to the hook 202. In some embodiments, the stretchable band 204 may be no longer than 1 inch, 2 inches, 3 inches, or 4 inches, which can assist in having the attachment assembly 200 not become loose and/or slack over time. In some embodiments, the stretchable band 204 may be longer than 1, 2, 3, 4, 5, 6, 7, or 8 inches. In some embodiments, the stretchable band 204 can stretch or elongate 0.1, 0.5, 1, 1.5, 2, 2.5, or 3 inches from its original state. In some embodiments, the stretchable band 204 can elongate greater than 0.1, 0.5, 1, 1.5, 2, 2.5, or 3 inches from its original state. In some embodiments, the stretchable band 204 can elongate less than 0.1, 0.5, 1, 1.5, 2, 2.5, or 3 inches from its original state. In some embodiments, the hook 202 can be attached directly to the cover 100 with no stretchable band, and the cover 100 itself can be flexible for attachment onto a vehicle.

Figure 5:
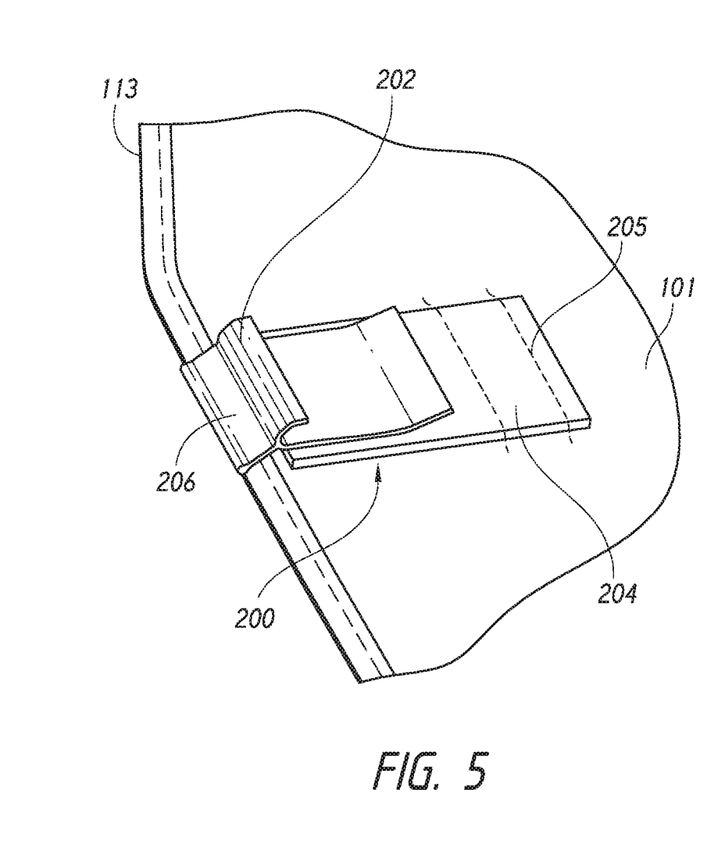
FIG. 5 illustrates an embodiment of an attachment assembly.
Figure 6:
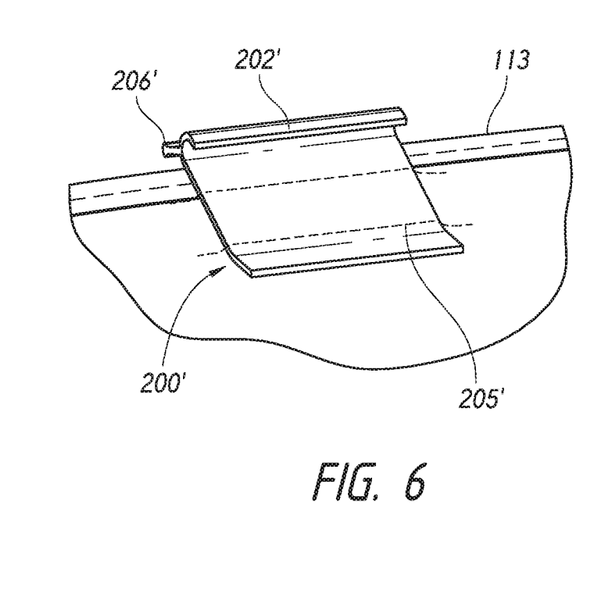
FIG. 6 illustrates an alternate embodiment of an attachment assembly.

FIGS. 5-6 illustrate two different embodiments of an attachment assembly 200/200'. FIG. 5 illustrates a hook 202 attached to a stretchable band 204 so that the hook 202 can move location as desired by a user. Further, as shown in FIG. 5, the stretchable band 204 can be attached to the inner surface 101 of the cover 100 through stitching/threading 205, but other attachment mechanisms can be used as well. In some embodiments, as shown in FIG. 5, the hook 202 can include compressible extension 209 opposite the hook portion of the hook 202.

On the other hand, FIG. 6 illustrates an attachment assembly 200' that does not utilize the stretchable band 204. Instead, the hook 202' and tab 206' is directly attached to the inner surface 101 of the cover 100, such as through stitching/threading 205', though other attachment mechanism can be used as well. Thus, the hook 202' cannot be stretched away from the cover 100, providing more stability to the cover 100 when attached.

In some embodiments, the hook 202' can be wider than hook 200. For example, it can be 1.1, 1.2, 1.3, 1.4, 1.5, 1.6, 1.7, 1.8, 1.9, or 2.0 times wider. In some embodiments, it can be greater than 1.1, 1.2, 1.3, 1.4, 1.5, 1.6, 1.7, 1.8, 1.9, or 2.0 times wider. it can be less than 1.2, 1.3, 1.4, 1.5, 1.6, 1.7, 1.8, 1.9, or 2.0 times wider. In some embodiments, the hook 200 may be wider than hook 202' in the same way as described in this paragraph.

Figure 7:
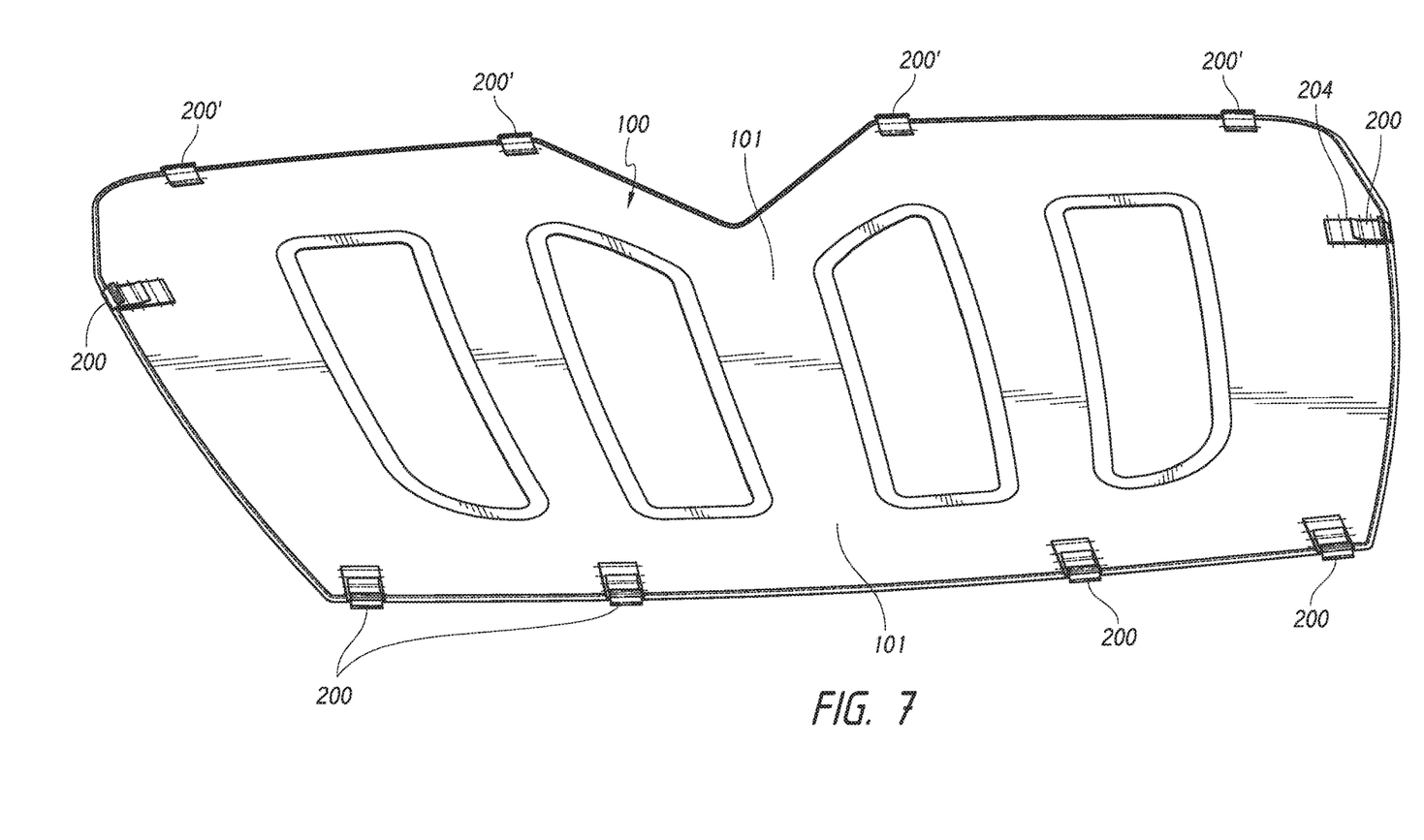
FIG. 7 illustrates an inner surface of an embodiment of a grill cover.

While the illustrated combination of attachment assemblies has advantages, other combinations of the attachment assemblies 200/200' can be used on an outer perimeter of the cover 100 and still provide certain benefits. For example, as shown in FIG. 7, a top edge 103 may include all of attachment assemblies 200', and thus no stretchable bands, where the remainder attachment assemblies are attachment assemblies 200, thus including the stretchable band 204. In some embodiments, the cover 100 may include four attachment assemblies 200' on a top edge 103, four attachment assemblies 200 on a bottom edge 107, and one attachment assembly 200 on each side 111/109. However, this particular configuration does not limit the disclosure and other configurations can be used as well.

In some embodiments, the band may not be stretchable, but instead may include another mechanism for loosening and tightening, such as ratcheting or having components slide within a slot. Further, springs, rubbers, polymers, or other stretchable mechanisms can be used. In some embodiments, additional tension can be applied to the bands 204 in order to improve grip on a vehicle grill.

In some embodiments, the cover 100 can include a plurality of attachment assemblies 200. For example, there can be at least one attachment assembly 200 on a top, bottom, and both sides of the cover 100. However, in some embodiments attachment assemblies 200 may not be located on the sides, or may not be located on the top and bottom.

As mentioned, FIG. 7 illustrates a view of the inner surface 101 showing how a plurality of attachment assemblies 200 can be used, and located around the perimeter of the cover 100. In some embodiments, each attachment assembly 200 can also have an attachment assembly 200 located on an opposite side of the cover 100. For example, a first attachment assembly 200 can be attached to the cover 100 near edge 109. A second separate attachment assembly 200 can then be attached to the cover 100 near edge 111. Thus, the stretchable band 204 of the attachment assembly 200 need not stretch along the length (L) of the cover 100, and each stretchable band 204 can be attached near the edges 109 and 111.

In some embodiments, the stretchable band 204 extends the length (L) of the cover 100 (e.g., generally from the first side 109 to the second side 111 or from near the edge of the first side 109 to near the edge of the second side 111), and a hook 202 can be located on each end of the elastic material 204 on opposite sides of the cover 100. For example, the hooks can be located generally at the first side 109 and the second side 111, and the stretchable band 204 can extend between the hooks.

In some embodiments, the cover 100 can include 1, 2, 4, 5, or 6 attachment assemblies 200 on a top edge 105 of the cover 100. In some embodiments, the cover 100 can include greater than 1, 2, 4, 5, or 6 attachment assemblies 200 on a top edge 105 of the cover 100. In some embodiments, the cover 100 can less than 2, 4, 5, or 6 attachment assemblies 200 on a top edge 105 of the cover 100.

In some embodiments, the cover 100 can include 1, 2, 4, 5, or 6 attachment assemblies 200 on a bottom edge 107 of the cover 100. In some embodiments, the cover 100 can include greater than 1, 2, 4, 5, or 6 attachment assemblies 200 on a bottom edge 107 of the cover 100. In some embodiments, the cover 100 can less than 2, 4, 5, or 6 attachment assemblies 200 on a bottom edge 107 of the cover 100.

In some embodiments, the cover 100 can include 1, 2, 4, 5, or 6 attachment assemblies 200 on each side edge 109/111 of the cover 100. In some embodiments, the cover 100 can include greater than 1, 2, 4, 5, or 6 attachment assemblies 200 on each side edge 109/111 of the cover 100. In some embodiments, the cover 100 can less than 2, 4, 5, or 6 attachment assemblies 200 on each side edge 109/111 of the cover 100. In some embodiments, each side edge 109/111 of the cover 100 can have the same number of attachment assemblies 200. In some embodiments, each side edge 109/111 of the cover 100 can have a different number of attachment assemblies 200.

In some embodiments, the hook 202 can be integrally formed with the stretchable band 204. In some embodiments, the hook 202 can be attached to the stretchable band 204, such as by sewing, mechanical fastening, gluing, or chemically adhering. The hook 202 can be attached on an inner surface, an outer surface, or an end of the stretchable band 204.

The stretchable band 204 can permit the hook 202 to stretch over the edge of the vehicle grill 102, thereby attaching the cover 100 to the grill 102. The hook 202 can wrap around, or partially wrap around, or enclose, or partially enclose an edge of the grill 102. Thus, the hook 202 can be pulled further than the edge of the grill 102 and released, where the elastic material 202 pulls the hook to capture the edge of the grill 102. In some embodiments, two hooks can be used, one on each side of the cover 100. In some embodiments, two, three, four five, or six hooks can be used. In some embodiments, greater than two, three, four five, or six hooks can be used. In some embodiments, less than two, three, four five, or six hooks can be used.

The attachment assembly 200 can further include at tab 206, which can extend laterally away from the cover 100. In some embodiments, each attachment assembly 200 can include more than one tab. As shown, the tab 206 can include a straight portion 208 and a bulbous portion 210, allowing for easier grip of the tab 206. This allows a user to grab the tab 206 and pull it laterally away from the grill 102, stretching the band 204 and releasing the hook 202 and thus the cover 102. The tab 206 can be integrally formed with the hook 202. In some embodiments, the tab 206 is separate from the hook 202 and then attached to the hook 202. In some embodiments, each hook 202 can include a tab 206. In some embodiments, there may be different numbers of tabs 206 and hooks 202. In some embodiments, two, three, four five, or six tabs can be used. In some embodiments, greater than two, three, four five, or six tabs can be used. In some embodiments, less than two, three, four five, or six tabs can be used.

Accordingly, embodiments of the disclosed cover 100 can be attached to a vehicle without the use of screws, nails, adhesives, etc. between the cover 100 and the vehicle. Thus, the cover 100 can be screwless, drilless, no-drill, or no-screw. Accordingly, the aesthetics of the vehicle, including the grill 102 can be preserved upon removal of the cover 100.

From the foregoing description, it will be appreciated that inventive grill covers and attachment clips are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A cover assembly for a vehicle grill, the cover assembly comprising:
    a cover configured to cover a front-facing surface of a vehicle grill, the cover having an outward facing surface, an inward facing surface, and a perimeter, wherein the cover is attachable to the vehicle grill without drilling or adhesive; and
    a plurality of attachment assemblies for removably attaching the cover to the vehicle grill, each of the plurality of attachment assemblies comprising:
        a stretchable band attached to the inward facing surface of the cover; and
        a hook attached to the stretchable band, wherein the hook is configured to partially surround a portion of the vehicle grill;
    wherein the hook is spaced away from the cover and attached to the cover via the stretchable band and no adhesive is used between the cover and the vehicle grill.

2. The cover assembly of claim 1, wherein each of the stretchable bands extends from one end of the cover to an opposite end of the cover.

3. The cover assembly of claim 1, wherein each of the plurality of attachment assemblies further comprises a tab, wherein the tab is attached to the hook and extends away from the hook.

4. The cover assembly of claim 1, wherein the cover is flexible and is configured to contour on the vehicle grill.

5. The cover assembly of claim 1, wherein the cover includes at least one through aperture extending over half of a height of the cover.

6. The cover assembly of claim 5, wherein the cover includes at least four through apertures extending over half of a height of the cover.

7. The cover assembly of claim 1, wherein the cover is a vinyl cover.

8. The cover assembly of claim 1, wherein the plurality of attachment assemblies are located on a top edge and a bottom edge of the cover.

9. The cover assembly of claim 8, wherein the plurality of attachment assemblies are further located on each side edge of the cover.

10. The cover assembly of claim 1, wherein the inward facing surface is formed of a first material, and the outward facing surface is formed of a second material, and wherein the first material is attached to the second material.

11. The cover assembly of claim 1, wherein the perimeter of the cover is formed of a thicker material than a remainder of the cover.

12. The cover assembly of claim 11, wherein the thicker material is separate from the cover and is attached onto the perimeter of the cover.

13. A method of installing a cover to a vehicle grill, the method comprising:

positioning a cover over a front surface of the vehicle grill, the cover having an outward facing surface, an inward facing surface, and a perimeter, wherein the cover is attachable to the vehicle grill without drilling or adhesive;

securing a first portion of the cover to a first portion of the vehicle grill using a first connector, without altering the structure of the vehicle grill, wherein the first connector is spaced away from the cover and attached to the cover via a stretchable band; and securing a second portion of the cover to a second portion of the vehicle grill using a second connector, wherein the second connector is spaced away from the cover and attached to the cover via a stretchable band;

wherein and no adhesive is used between the cover and the vehicle grill.

14. The method of claim 13, the securing of the first portion of the cover to the first portion of the vehicle grill comprising securing a portion of the first connector secured to the cover behind the first portion of the vehicle grill.

15. The method of claim 14, the securing of the second portion of the cover to the second portion of the vehicle grill comprising securing a portion of the second connector behind the second portion of the vehicle grill.

16. The method of claim 13, wherein the cover is flexible and is configured to contour on the vehicle grill.

17. The method of claim 13, wherein the cover includes at least one through aperture extending over half of a height of the cover.

18. The method of claim 17, wherein the cover includes at least four through apertures extending over half of a height of the cover.

19. The method of claim 13, wherein the cover is a vinyl cover.

20. The method of claim 13, wherein the inward facing surface is formed of a first material, and the outward facing surface is formed of a second material, and wherein the first material is attached to the second material.

21. The method of claim 13, wherein the perimeter of the cover is formed of a thicker material than a remainder of the cover.

22. The method of claim 21, wherein the thicker material is separate from the cover and is attached onto the perimeter of the cover.

23. The method of claim 13, wherein the cover comprises a plurality of attachment assemblies for securing the cover to the vehicle grill, each of the plurality of attachment assemblies comprising:
the stretchable band attached to the inward facing surface of the cover; and
a hook attached to the stretchable band, wherein the hook is configured to partially surround a portion of the vehicle grill.

24. The method of claim 23, wherein each of the stretchable bands extends from one end of the cover to an opposite end of the cover.

25. The method of claim 23, wherein each of the plurality of attachment assemblies further comprises a tab, wherein the tab is attached to the hook and extends away from the hook.

26. The method of claim 23, wherein the plurality of attachment assemblies are located on a top edge and a bottom edge of the cover.

27. The method of claim 26, wherein the plurality of attachment assemblies are further located on each side edge of the cover.

28. The method of claim 13, wherein securing the first portion of the cover to the first portion of the vehicle grill comprises wrapping the first portion of the cover at least partially around the first portion of the grill.

29. The method of claim 28, wherein securing the first portion of the cover to the first portion of the vehicle grill comprises elastically gripping said first portion of the grill with the first portion of the cover after the first portion of the cover is positioned at least partially around the first portion of the grill.

30. A cover assembly for a vehicle grill, the cover assembly comprising:
a cover configured to cover a front-facing surface of a vehicle grill, the cover having an outward facing surface, an inward facing surface, and a perimeter, wherein the cover is attachable to the vehicle grill without drilling or adhesive; and
a plurality of attachment assemblies for removably attaching the cover to the vehicle grill, each of the plurality of attachment assemblies comprising:
a first securement portion configured to wrap at least partially around a first portion of the grill; and
an elastic portion connected to first securement portion, such that the elastic portion facilitates holding the first portion of the cover in position after the first portion of the cover is positioned at least partially around the first portion of the grill
wherein the first securement portion is spaced away from the cover and attached to the cover via the elastic portion and no adhesive is used between the cover and the vehicle grill.

* * * * *